United States Patent [19]

Knobbe et al.

[11] Patent Number: 4,987,001
[45] Date of Patent: Jan. 22, 1991

[54] METHOD AND APPARATUS FOR COATING THE INTERIOR SURFACE OF HOLLOW, TUBULAR ARTICLES

[75] Inventors: Alan J. Knobbe, Lorain, Ohio; Joseph A. E. Pintelon, Lennik, Belgium; Daniel Pinault, Niederkruchten, Fed. Rep. of Germany

[73] Assignee: Nordson Corporation, Westlake, Ohio

[21] Appl. No.: 308,897

[22] Filed: Feb. 9, 1989

[51] Int. Cl.$^5$ .......................... B05D 1/06; B05D 7/22; B05B 5/12
[52] U.S. Cl. .................................... 427/28; 427/181; 427/236; 427/238; 427/239; 118/622; 118/312; 118/317
[58] Field of Search ................. 427/28, 236, 181, 238, 427/239; 118/622, 312, 317

[56] References Cited

U.S. PATENT DOCUMENTS

| | | |
|---|---|---|
| 1,830,598 | 11/1931 | Fagan . |
| 3,291,631 | 12/1966 | Smith . |
| 3,422,795 | 1/1969 | Smith . |
| 3,815,535 | 6/1974 | Becker et al. . |
| 3,901,184 | 8/1975 | Payne et al. ............... 118/312 X |
| 3,904,930 | 9/1975 | Waldron et al. . |
| 3,918,401 | 11/1975 | Blakeslee ................ 118/312 X |
| 4,013,185 | 4/1977 | Myers . |
| 4,071,192 | 1/1978 | Myers . |
| 4,090,666 | 5/1978 | Peck . |
| 4,109,027 | 8/1978 | Crose ..................... 118/622 X |
| 4,158,071 | 6/1979 | Jordan et al. ................ 427/33 |
| 4,170,074 | 10/1979 | Heckman et al. .............. 427/28 X |
| 4,180,844 | 12/1979 | Peck . |
| 4,183,974 | 1/1980 | Coucher et al. ............. 427/236 X |
| 4,289,278 | 9/1981 | Itoh . |
| 4,314,669 | 2/1982 | Moos . |
| 4,378,386 | 3/1983 | Rehman ..................... 427/233 |
| 4,399,945 | 8/1983 | Ruud . |
| 4,401,275 | 8/1983 | Ruud . |
| 4,600,603 | 7/1986 | Mulder . |

FOREIGN PATENT DOCUMENTS

| | | |
|---|---|---|
| 0268126 | 10/1987 | European Pat. Off. . |
| 2838763 | 3/1979 | Fed. Rep. of Germany . |
| 2914960 | 10/1980 | Fed. Rep. of Germany . |

OTHER PUBLICATIONS

Frei Ag—catalogue excerpt.
Nordson Corporation—"Tribomatic Powder Spray Gun"—catalogue excerpt (p. 3, duplicated).

Primary Examiner—Evan Lawrence
Attorney, Agent, or Firm—Wood, Herron & Evans

[57] ABSTRACT

A method and apparatus for spraying a solid particulate powder onto the interior surface of tubular articles by intermittently pumping the powder from a fluidized bed of powder through a powder supply line containing an intermittently operated venturi pump and air amplifier, as well as a pair of constantly operated air diffusers and an electrostatic charging apparatus. A powder collection shroud adjacent at least one open end of the tubular article has a carefully regulated vacuum applied thereto in order to collect oversprayed powders.

22 Claims, 5 Drawing Sheets

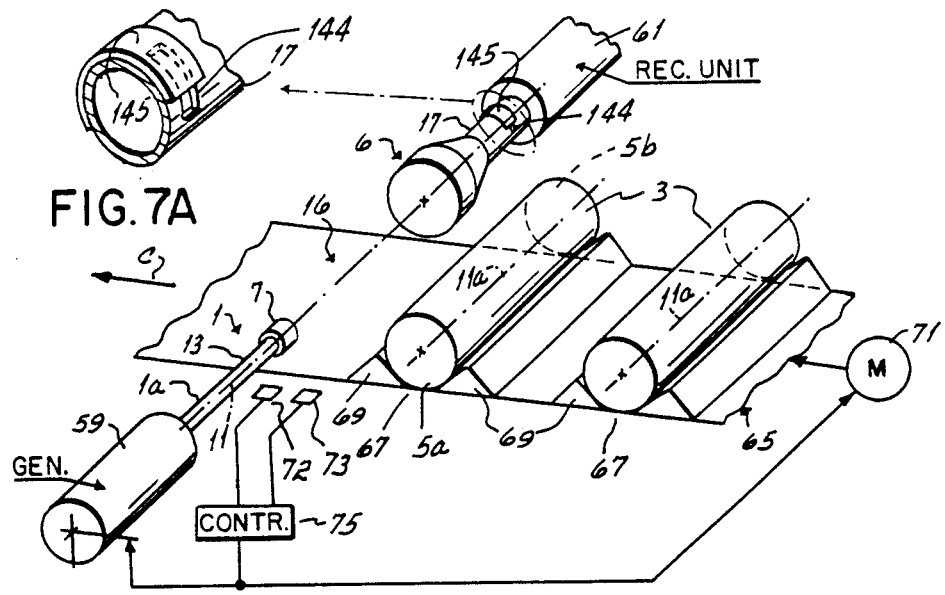
FIG. 7A
FIG. 7
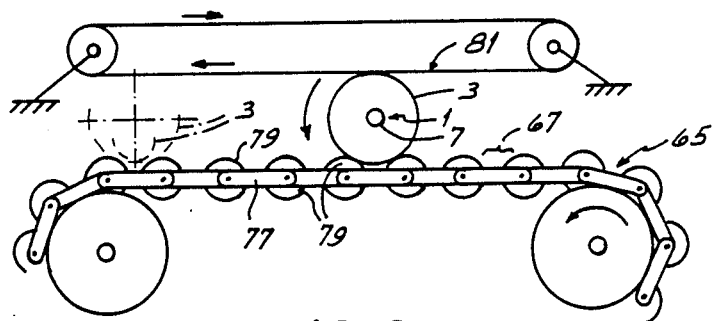
FIG. 8

METHOD AND APPARATUS FOR COATING THE INTERIOR SURFACE OF HOLLOW, TUBULAR ARTICLES

This invention relates to a method and apparatus for spraying solid particulate powder materials, and more particularly, to a method and apparatus for spraying solid particulate powder materials onto the interior surface of tubular objects, especially of cylindrical, tubular objects, such as can bodies.

It is known to coat the interior surface of hollow, tubular objects, such as can bodies, in a coating process wherein powder spray is introduced through the open end of the can bodies. Such a powder spray process for coating the interior surface of can bodies is described in U.S. Pat. No. 4,158,071. According to this technique, the hollow, cylindrical can bodies or articles are indexed past a spray nozzle which directs powder spray into one open end of the article while simultaneously collecting oversprayed powder from the opposite end of the article. According to the disclosure of this '071 patent, the tubular articles are positioned at a coating station between a powder supply tube and a return tube, which tubes are spaced apart a distance slightly greater than the length of the article to be coated. In each tube there is a corona discharge electrode such that powder sprayed into the interior of the tubular article is initially charged as it passes from the spray nozzle through the supply tube and is further charged within the tubular article itself by an electrical field established by the two opposed corona electrodes located on opposite sides of the tubular article.

The apparatus disclosed in the above-identified patent requires that the articles to be coated have two open ends, or in the case of can bodies, that the can body be that of a three-piece can. This apparatus is therefore unsuitable for the coating of the bodies of two-piece cans.

It has therefore been an objective of this invention to provide a powder spray system for spray coating the interior surface of tubular objects having either two open ends or only one open end.

In the operation of the apparatus disclosed in the above-identified patent, the powder is applied intermittently, i.e., only when a tubular article is located in alignment with the supply and recovery tubes. The powder is therefore turned off or the powder flow interrupted while coated cans are removed from the coating station and new cans inserted therein. This repeated turning on and off or intermittent flow of powder creates problems in applying an even coating to the interior of the tubular articles because there is a tendency for powder to settle in the powder flow lines when the powder flow is interrupted, and then to emerge from the line as a dense cloud or puff of powder when the powder flow is restarted. This results in an uneven coating of powder on the interior surface of the articles to be coated, i.e., the target articles.

It has therefore been another objective of this invention to provide an intermittent powder spray apparatus wherein air-entrained powder may be sprayed onto the interior surface of a hollow article while maintaining an even flow of powder throughout the powder flow cycle.

This objective is achieved in accordance with the practice of this invention by pumping the air-entrained powder toward a spray nozzle by means of a venturi pump to which air is intermittently supplied to effect the intermittent pumping while maintaining a constant flow of air through an air diffuser into the powder flow stream downstream of the pump but upstream of the nozzle. Thereby, an elevated gas pressure is maintained within the powder flow path when the pump is turned off, and all powder is thereby purged from the line along the powder flow path between pulses. The elevated gas pressure supplied to the powder flow path flows both upstream through the venturi pump and downstream out of the nozzle to effect this purging of the powder flow line. This purging effect results in cleaning of the powder flow line between powder pulses so that every pulse may start under well-controlled conditions and with a clean powder flow line.

A powder recovery shroud is coaxially aligned with the spray nozzle. This shroud is connected to a vacuum source and includes a pressure regulator operative between the shroud and the vacuum source to regulate the pressure in the recovery shroud so as to accurately control the recovery of powder without applying so much vacuum as to pull the powder off of the interior surface of the tubular article.

The powder is electrostatically charged before it contacts the interior surface of the tubular articles, but in accordance with the practice of this invention, electrostatic charging of the powder occurs before the powder reaches the nozzle. This location of the electrostatic charge applying means enables the electrostatically charged powder to be applied to the interior surface of an article, such as a can body, much more effectively than is the case if the powder is charged after emerging from the nozzle—as in the above-identified patent. In fact, powder so charged may be applied to the complete interior surface of even a closed-end tubular article, such as a two-piece can body. In the case of a two-piece can body, i.e., an article having one closed end, electrostatically charged powder is generally precluded from contacting and adhering to the closed end of the hollow object by the so-called "Faraday cage" effect. But, this adverse "Faraday cage" effect has been found to be avoided by electrostatically charging the powder either by friction (tribocharging) or by corona discharge, so long as the charging of the powder occurs upstream of the spray nozzle or before the charged powder reaches the spray nozzle. Additionally, application of the powder to the interior surface of a closed end can has been enhanced according to the practice of this invention by spraying the powder through a nozzle which aerodynamically directs the powder to the can surface to be coated without interference from a strong electrostatic field which would produce the Faraday cage effect noted above.

The invention of this application is operative to protectively cover the entire interior surface of an article with a minimum amount of powder. Thereby, the cost of coating the interior surface of multiple articles in a production line is minimized. To that end, the invention of this application utilizes a powder having an average powder grain diameter of less than 20 micrometers, preferably of approximately 10 micrometers. Such fine-grained powder is difficult to fluidize in order to enable the powder to be conveyed to a spray nozzle because the fine-grained powder tends to collect in the pores of the porous bottom plate of a fluidizing bed hopper and clog those pores. To overcome this problem, the fluidizing bed hopper of this invention includes a mechanical agitator in the form of a stirrer located in the fluidizing bed adjacent the outlet orifice through which the fluidized material is conveyed from the fluidized bed to a venturi powder pump.

In keeping with the objective of maintaining an even flow of powder from a nozzle of an intermittently pulsed spray system, the invention of this application includes a spray nozzle which is connected to a powder source and a powder pump via a continuous powder flow line, which line may be reciprocated and moved with the nozzle. Thereby, there are no fluid flow lines between the pump and nozzle to bend or flex and collect powder in the line. Thereby, sharp powder flow cutoff and sharp flow startup, as well as an even flow of powder from the nozzle, is maintained.

These and other objects and advantages of this invention will become more readily apparent from the following description of the drawings in which:

FIG. 7 is a schematic illustration of a conveyor arrangement utilized in the practice of the invention of this application.

FIG. 7A is an enlarged view of the encircled portion of FIG. 7.

FIG. 8 is a schematic illustration of a preferred construction of the conveyor of FIG. 7.

Figure 1:
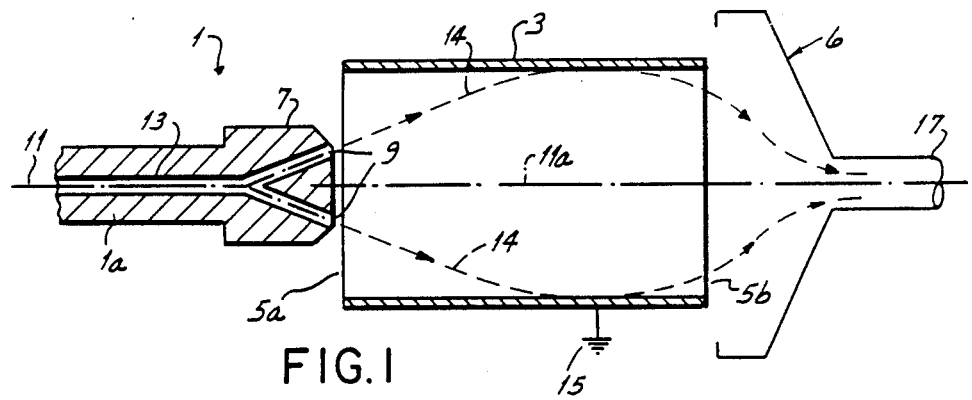
FIG. 1 is a schematic diagram of a powder spray nozzle and powder recovery shroud arrangement for applying powder to the interior surface of a cylindrical, tubular object in accordance with the practice of the invention of this application.

With reference first to FIG. 1, there is illustrated schematically a powder spray nozzle assembly 1 operative to spray air-entrained powder into a tubular, cylindrical target article 3. The target article in this instance has two open ends 5a and 5b, the end 5b remote from the nozzle 1 being surrounded by a collection shroud 6. Gas-conveyed powder, preferably air-entrained powder, is blown through a nozzle support arm 1a and through a nozzle 7 via nozzle discharge openings or ports 9. The nozzle openings 9 are symmetrically arranged around the axis 11 of the air-entrained powder supply line 13 within the nozzle support arm 1a. A jet of air-entrained powder is ejected from the nozzle ports 9, which jet is rotationally symmetrical with respect to the axis 11. The target article, in this case a tubular cylinder such as the body of a three-piece can, is positioned coaxially to the axis 11 of the nozzle such that the jet of air-entrained powder is directed onto the interior surface of the article 3. As explained more fully hereinafter, the powder of the powder jet 14 is electrostatically charged prior to arrival of the powder at the nozzle. In order to attract and attach the powder to the interior surface of the tubular, cylindrical target, the target substrate is grounded as indicated by the numeral 15.

Surrounding and covering the opening 5b of the tubular, cylindrical article 3 at the end opposite from the nozzle 1 there is a powder recovery shroud 6. This shroud is connected to a vacuum source via a tube 17 such that a vacuum is applied to the inside of the shroud and thus, to a limited extent, the inside of the article 3. This shroud is operative to suction off excess powder which does not adhere to the inside surface of the article 3. Typically, this excess powder is led by means of the tube 17 to a powder recovery unit for reuse of the excess powder.

When coating tubular articles having two open ends, powder spray may be directed through one of the open ends and excess powder recovered at the other, as shown in FIG. 1. But, this technique is not possible when coating tubular articles which have only one open end, as for example, the bodies of two-piece cans.

Figure 2:
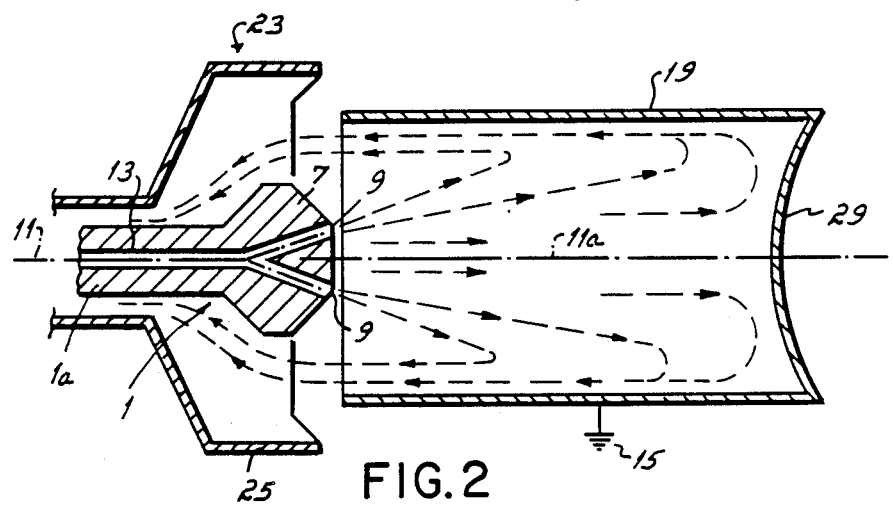
FIG. 2 is a partially diagrammatic cross-sectional view of a powder spray nozzle and powder recovery shroud arrangement for spraying the interior of a closed-end, tubular, cylindrical object in accordance with the invention of this application.

In FIG. 2 there is schematically illustrated the technique for spraying tubular articles which have only one open end. As there illustrated, gas-entrained powder which has been electrostatically charged is supplied through a powder supply line 13 to the nozzle openings 9 of nozzle 7. Around the nozzle 7 there is provided a vacuum or powder recovery shroud 23, which shroud is coaxially aligned with respect to the axis 11 of the nozzle 7. During the coating of the closed-end article 19, the article is coaxially aligned with the axis 11 of the nozzle and vacuum shroud 23. Preferably, the outer peripheral wall 25 of the shroud 23 is also cylindrical in configuration and slightly exceeds the diameter of the tubular, cylindrical article 19.

Electrostatically charged powder, which powder is electrostatically charged upstream of the nozzle by either friction or by a corona electrode, is sprayed from the nozzle 7 and generally follows the path indicated by the dashed lines of FIG. 2. As illustrated in these dashed lines, the injected air-entrained powder fills the interior of the article 19 and flows radially outwardly toward the walls of the article and then back along the walls into the shroud. Due to the electrostatic charge on the powder particles, a substantial portion of the sprayed powder adheres to the interior wall of the article 19 so that only excess powder and conveying air is removed by the vacuum shroud 23 and fed back to a powder recovery unit. By adjusting the pressure of the powder conveying airstream and the pressure of the vacuum contained in the powder recovery shroud 23, the nozzle of the spray gun is permitted to optimally direct the coating of powder onto the sidewalls, as well as onto the bottom wall 29, of the article 19.

Figure 3:
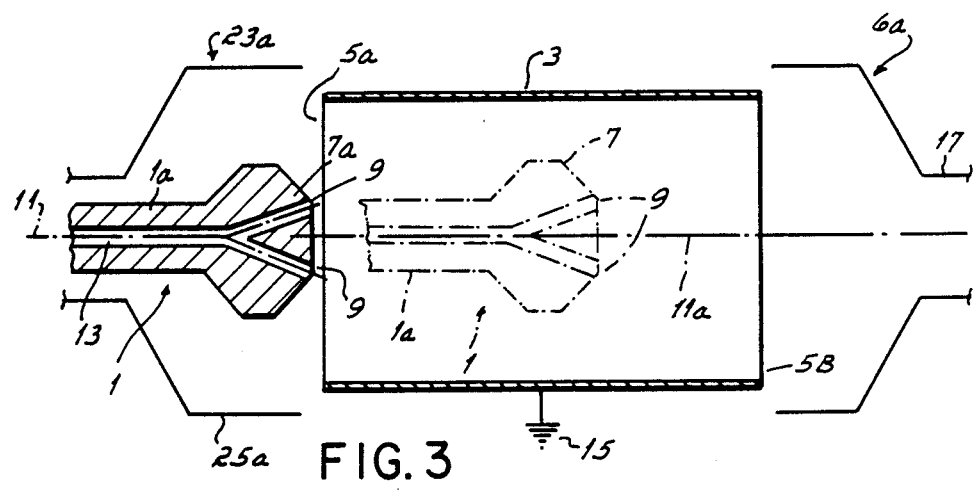
FIG. 3 is a partially diagrammatic illustration of a spray nozzle powder recovery shroud arrangement for spraying the interior surface of a tubular, cylindrical object in accordance with a third practice of the invention of this application.

In FIG. 3 there is illustrated another coating technique for coating the interior surface of cylindrical, tubular articles 3 which have two open ends 5a, 5b. According to this technique, a nozzle assembly 1a and collection shroud 6a at the end opposite from the nozzle assembly 1a are provided. This nozzle assembly 1a and powder collection shroud 6a are identical to the nozzle assembly 1 and shroud 6 of FIG. 1. Additionally, though, in the practice of the technique employed in FIG. 3, an additional shroud 23a is provided at the open end adjacent to which the nozzle assembly 1a is located. Thus, according to the technique illustrated in FIG. 3, a single nozzle assembly 1a is utilized to spray electrostatically charged powder onto the interior surface of the tubular, cylindrical article 3 while oversprayed powder is collected from both open ends 5a, 5b of the body 3.

In the practice of the coating technique illustrated in FIGS. 1–3 the nozzle assembly 1 or 1a may be reciprocated into and then back out of the can body 3 or 19 while electrostatically charged powder is dispensed from the discharge orifices 9 of the nozzles. The necessity for reciprocation of the nozzle assembly is believed to be a function of the axial length of the tubular object 3 or 19 and the shape of the tubular object and coverage requirements for the tubular object.

With reference now to FIGS. 7 and 8 there is illustrated a portion of a coating system for applying powder to the interior of cylindrical bodies 3 in accordance with the technique illustrated and described in FIG. 1. This system includes a powder stream generator unit 59 for generating a powder pulse or powder stream whenever a body 3 is axially aligned with the nozzle 7 of the generator 59. Whenever a body 3 is not aligned with the nozzle 7, the powder flow is interrupted so as to avoid oversprayed powder while bodies are moved into and out of alignment with the nozzle 7.

The powder stream generator unit 59 receives an enabling control input signal E effective to initiate the spraying of a stream of powder from the generator and generates at the end of a predetermined spray cycle an end of coating signal EC.

The system illustrated in FIG. 7 includes a vacuum hood 6 for recovering excess powder. As explained more fully hereinafter, this hood 6 is connected to a powder recovery unit 61. While the system illustrated in FIG. 7 corresponds and practices the technique of spraying illustrated in FIG. 1, the system could as well be used to practice the techniques illustrated and described with reference to FIGS. 2 and 3 hereinabove in which event an additional powder recovery shroud could be added to the system at the spray nozzle end of the article.

The powder coating unit illustrated in FIG. 7 is operative to spray articles 3 when those articles are located at a spray station 16, which station is colinearly aligned with the axis 11 of the nozzle 7 and powder recovery shroud 6. Articles 3 are conveyed to the powder spray station on an endless belt conveyor 65. This conveyor 65 transports articles 3 in a direction perpendicular to the axis 11 of the nozzle and powder recovery hood 6. On the endless belt conveyor 65 there are article receiving grooves 67 formed between positioning lugs 69. The articles 3 rest atop and between a pair of these lugs 69 with the axes 11a of the tubular, cylindrical articles 3 arranged perpendicular to the direction of movement of the conveyor 69 and parallel to the axis 11 of the nozzle and powder recovery hood 6. The nozzle 7 and powder recovery shroud 6 are located above the plane of the endless belt conveyor 65 so that the distance of the axis 11 from the plane of the conveyor 65 is exactly the same distance as the distance the axis 11a of the tubular articles 3 is spaced from the top surface of the conveyor 65. As a consequence of this relative location of the axes 11 and 11a of the nozzle and cylindrical articles, respectively, the axes 11a of the articles are coaxially aligned with the axes 11 of the nozzle and hood when the articles 3 are located in the spray station 16. To move the articles into and out of the spray station, the conveyor 65 is driven in the direction C by a drive motor 71.

The controller 75 receives a signal from a proximity switch 73 indicating the presence of an article 3 in front of the generator 59. The controller 75 also receives a signal from a sensor 72 indicative of whether the conveyor has stopped or is moving. If an article 3 is in front of the generator 59 and the conveyor has stopped, then the controller causes the pulse generator 59 to spray a pulse of powder onto the article. Once that pulse is completed, the conveyor indexes the next article into position and the controller again senses the condition of the proximity switch and can movement sensor in order to start or temporarily hold the next cycle.

Instead of providing only one powder stream generator 59 and recovery shroud 6, as shown in FIG. 7, two such units may be provided adjacent one another with a distance between them equal to the distance between two or more articles 3 on the conveyor 65. If two or more coating stations are provided along the conveyor 65, two or more articles 3 may be simultaneously coated at the coating stations. Or, alternatively, one end of one article 3 may be coated at one coating station and the opposite end coated at another station.

With reference now to FIG. 8, there is schematically illustrated a preferred embodiment of the conveyor 65. In this preferred embodiment, the endless belt conveyor 65 comprises a pair of parallel, endless chains 77 (only one of which is illustrated) drivingly connected to a drive shaft D. The receiving grooves 67 for the articles 3 are formed between rollers 79 which are rotatably connected between the chains 77. Provision of the rollers 79 functioning as lugs 69 has the advantage that, as shown in dashed lines to the left-hand side of FIG. 8, tubular articles 3 of different diameter may be received on such rollers 79 without the need to change the spacing between the rollers. When there is a change in the diameter or shape of articles 3, the position of the powder stream generator 59 and powder recovery shroud 6 can be varied as necessary to fit the new article. Simultaneously, a new nozzle may be fitted onto the generator 59, and the position of proximity switch 72 may be adjusted to match the configuration of the new article.

In some instances, it is advantageous to rotate the articles 3 around the axis while powder is sprayed into the interior of the articles. To effect this rotation, there is provided a driving endless belt 81, which endless belt has a lower run which extends parallel to the upper run of the can supporting conveyor 65. The distance between the two parallel runs of the belt conveyors 81 and 65 may be adjusted so that articles 3 of different diameters may be supported between the belts and driven in rotation by the upper drive belt 81.

Figure 4:
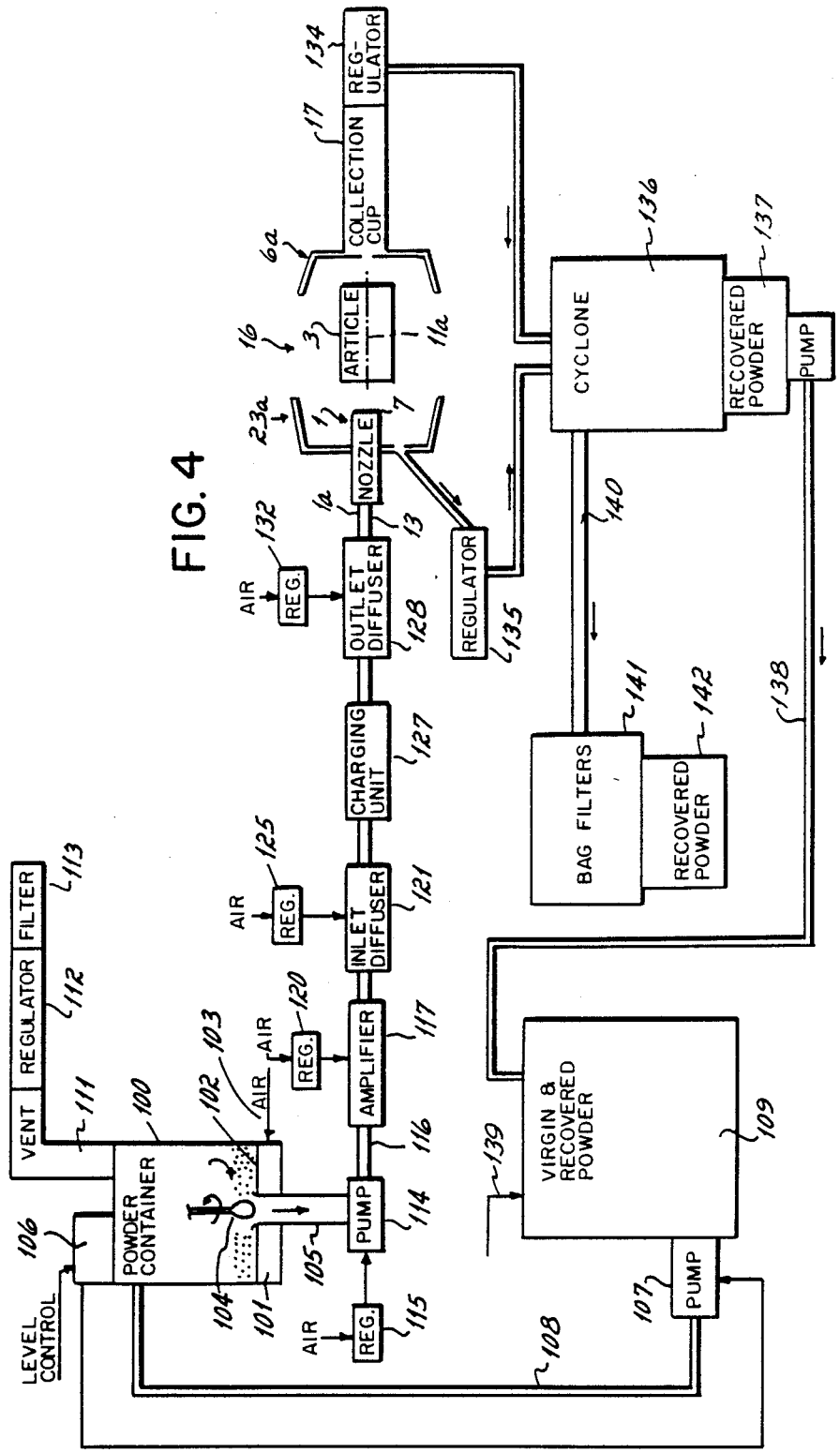
FIG. 4 is a diagrammatic illustration of a complete system for interiorly coating tubular, cylindrical articles in accordance with the invention of this application.
Figure 5:
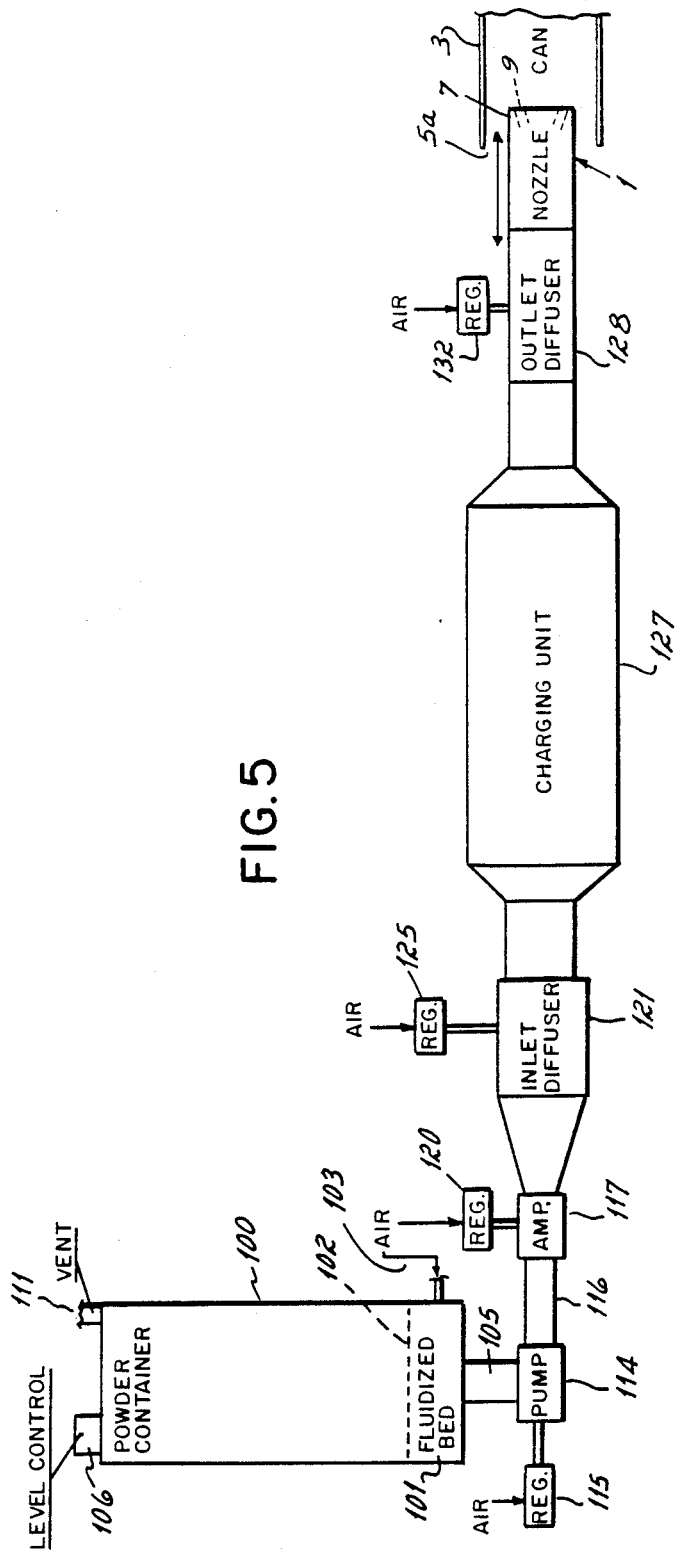
FIG. 5 is a side elevational view of a portion of the powder spray system of FIG. 4.
Figure 6:
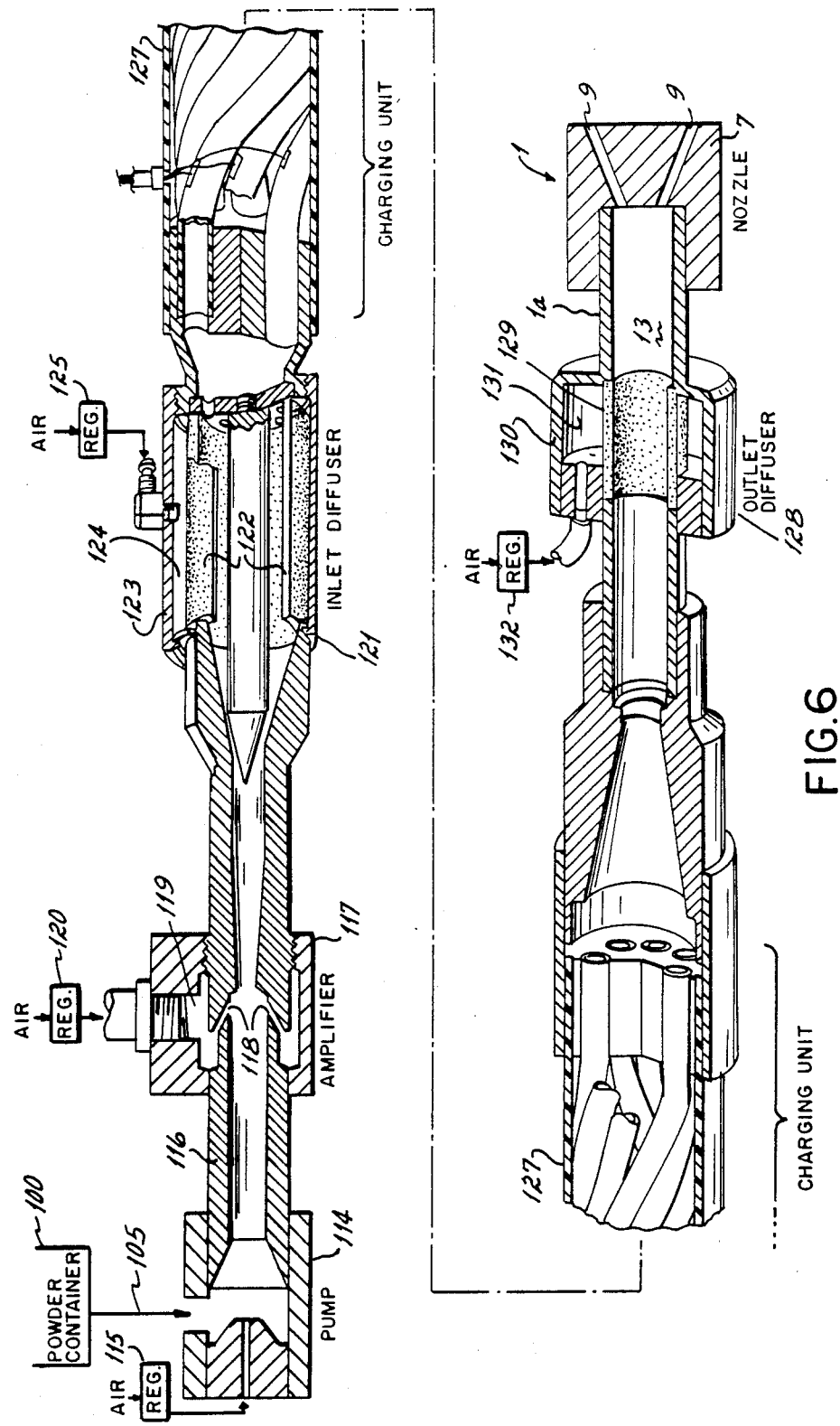
FIG. 6 is a cross-sectional view through the portion of the powder spray system illustrated in FIG. 5.

With reference now to FIGS. 4–6 there is illustrated a complete system for interiorly powder coating tubular, cylindrical articles. This system comprises a fluidizing bed powder container or hopper 100 which is constructed in the manner disclosed in EP-A-O-268126. This container comprises a bottom fluidizing bed plate 102 of porous material. Fluidizing air 103 into the chamber 101 of the container 100 is directed upwardly from the air chamber 101 through the fluidizing bed bottom plate 102 so as to fluidize powder residing atop the plate 102. A mechanical agitator 104 in the form of a rotating stirrer is located internally of the container 100 adjacent the inlet end of an outlet conduit 105. This outlet conduit 105 extends through the bottom wall of the fluidizing bed and has an upper edge which projects above the top surface of the bottom porous plate 102.

A conventional level control sensor 106 is mounted atop the fluidizing bed hopper 100 and is operative to detect the fluid level within the container 100 and control a pump 107 to maintain a predetermined level of powder in the fluidizing bed container or hopper 100. The level control 106 is operative when the level of powder in the hopper falls below a predetermined level to actuate the pump 107 and cause it to pump powder along a line 108 from a powder container 109 to container 100. The powder container 109 contains both virgin or new powder, as well as oversprayed powder which has been collected and returned to the container 109.

The air pressure within the fluidizing bed hopper 100 is maintained substantially constant by means of a vent 111, a pressure regulator 112, and a filtered outlet 113 through which air from the fluidizing bed container 100 is vented to atmosphere.

Powder exiting from the fluidizing bed hopper 100 through the outlet conduit 105 enters a venturi pump 114. In accordance with the practice of the invention of this application, air pressure from a source of air pressure through a regulator 115 is pulsed or supplied intermittently to the pump 114 so as to cause powder to be suctioned from the conduit 105 out of the fluidizing bed hopper 100 and propelled through a pipe 116. To further accelerate the air-entrained powder from the pump 114, there is provided downstream of the pump an air amplifier 117. By increasing the speed of the powder through the charging unit 127, the triboelectric charge applied to the powder is correspondingly increased for more efficient application of the powder to the article.

With reference to FIG. 6, it will be seen that the amplifier 117 comprises a plurality of evenly distributed ports 118 located around the interior surface of the amplifier. Each of these ports is inclined in the direction in which the air-entrained powder is projected along the powder supply line 13 and is connected to an air inlet passage 119. Air to passage 119 and hence to these inclined passages 118 is supplied from a source of air pressure through an adjustable pressure regulator 120 such that the speed of the powder in the powder supply line may be regulated and closely controlled.

The air pressure supplied to the amplifier 117 is pulsed or turned on and off in synchronization with the pumping airflow to the powder pump 114.

Downstream of the air amplifier 117 the air-entrained powder stream passes through an inlet diffuser 121. This diffuser includes a porous cylinder 122 contained internally of a surrounding non-porous cylinder 123, there being an air chamber 124 between the two cylinders. Air to this chamber 124 is supplied from an air pressure source through a pressure regulator 125. The porous cylinder of the inlet diffuser may take the form of a sintered metal cylinder. Thus, an evenly distributed current of air is directed radially into the powder flow line from the regulator 125 through the porous cylinder 122 of the diffuser 121.

Downstream of the inlet diffuser 121 there is a triboelectric charging unit 127. This unit 127 functions to electrostatically charge the air-entrained powder contained in the powder supply line. The triboelectric charging unit is a conventional charging unit within which the air-entrained powder is directed into multiple spiral tubes contained internally of a casing. In the course of passage through these spiral tubes, the powder frictionally contacts the walls of the tubes and picks up an electrostatic charge therefrom. A complete description of this type of electrostatic charging unit may be found in U.S. Pat. No. 4,399,945.

Instead of a tribocharging unit 127, a conventional corona-discharge electrode arrangement may be used in the powder supply line of this application. Such a charging unit, though, must be located upstream of the nozzle 7, and preferably at the location in the powder supply line whereat the tribocharging unit 127 is located, such that the powder is electrostatically charged before it enters the nozzle.

After emerging from the spirally wound conduits of the tribocharging unit 127, the air-entrained powder enters a second or so-called outlet diffuser 128. This outlet diffuser 128 is constructed similarly to the inlet diffuser. That is, it comprises an inner porous cylinder 129 encased within a solid cylinder 130 and between which there is an air chamber 131. Inlet air is supplied to this air chamber 131 from an air supply source through a pressure regulator 132. From the internal chamber 131 of the outlet diffuser 128, the air passes radially through the porous cylinder 129 into the powder supply line. This air is maintained as a constant stream of air from the source through the pressure regulator 132, while the airstream to the pump 114 and amplifier 117 is pulsed or turned on and off in accordance with the alignment of articles 3 with the nozzle 7 of the powder supply line 13.

The powder supply line terminates at the nozzle 7 after flowing from the outlet diffuser 128. This nozzle is equipped with a surrounding powder recovery shroud 23 and is coaxially aligned, but spaced from, the powder recovery shroud 6. The powder recovery shroud 23, as well as the powder recovery shroud 6, are connected via pressure regulators 135 and 134, respectively, to a vacuum source part of a cyclone separator 136. Within the cyclone separator 136 the air is separated from the recovered powder, and the recovered powder is collected in a powder collector 137. From this collector 137 the recovered powder is pumped via line 138 to the tank 109 to be there mixed with virgin powder supplied to the tank 109 via an inlet 139. The air collected by the cyclone separator 136, along with some of the powder contained therein, is fed via line 140 to a filter unit 141 where the residual powder is collected in a collector 142.

In the use of the system illustrated in FIGS. 4–6 the articles 3 are indexed by the conveyor of FIGS. 7 and 8 into axial alignment with the axis 11 of the nozzle 7 and recovery shroud 6. When so aligned, a pulse of air is supplied through the pressure regulators 115, 120 associated with the powder pump 114 and air amplifier 117 into the pump 114 and amplifier 117. This pulse of air is operative to suck or withdraw powder from the fluidizing bed 100 into the powder pump 114, from whence it is pumped through the amplifier 117, the inlet diffuser 121, to the electrostatic charging unit 127. From the electrostatic charging unit the air-entrained and electrostatically charged powder is pumped through the outlet diffuser 128 to the nozzle 7. From the nozzle 7 the air-entrained powder is ejected as a jet of air-entrained, electrostatically charged powder which is rotationally symmetrical with respect to the axis 11. That is, the air-entrained powder is directed from multiple orifices 9 of the nozzle located in a generally circular pattern so that a rotationally symmetrical fan or pattern of air-entrained powder is directed from the nozzle onto the interior surface of the tubular, cylindrical article 3. Depending upon the length of the article 3, the nozzle may be lanced or reciprocated internally of the article so as to effect complete coverage of the interior surface of the article for the length of the article. In the event that the nozzle is lanced or reciprocated within the interior of the article 3, then the entire powder supply system, including the hopper 100, pump 114, amplifier 117, inlet diffuser 121, charging unit 127, and outlet diffuser 128, may be reciprocated along with the nozzle. Thus, there would be no flexible lines or powder supply conduits located in the powder supply line which may bend and function as traps to collect powder and cause erratic flow of powder from the nozzle while air is pulsed or caused to flow to the powder pump 114 and amplifier 117. This lack of flexible conduits in the powder supply line thus contributes to an even or constant flow of powder from the nozzle throughout the powder spray cycle.

Some of the electrostatically charged powder adheres to the interior surface of the article 3. That powder which does not adhere, though, is withdrawn from the interior surface of the article via the vacuum within the powder recovery shrouds 23 and 6. To insure that the appropriate vacuum is applied to the shrouds such that the oversprayed powder is all withdrawn through the shroud and caused to pass through the regulators 134, 135 back to the cyclone separator 136, each return line includes the regulators 134, 135. Each of these regulators consists of a slot 144 in the vacuum return line (see FIG. 7A), which slot is covered with an arcuate collar 145. This collar 145 extends for less than the full circumference of the conduit such that by rotating the collar, a greater or lesser extent of the slot 144 may be covered or uncovered. Thereby, the vacuum pressure in the return line may be adjusted so as to be appropriate to withdraw all oversprayed powder, but not so strong as to suck loosely adhered powder from the interior surface of the article.

One of the advantages of the system illustrated and described herein for applying powder to the interior surface of a hollow, cylindrical article is its ability to pulse powder flow to the interior surface of an article when an article is aligned with the discharge nozzle of the system, and then to maintain an even flow of powder from the nozzle during the powder flow or powder-on portion of the pulse cycle. At the conclusion of the pulse, when the airflow to the pump 114 and amplifier 117 is terminated or turned off, the flow of air to the inlet diffuser 121 and outlet diffuser 128 is maintained or remains on. This diffuser airflow is operative to purge the powder flow line 13 of the system of all powder such that when the next article is aligned with the nozzle and the air again turned on to the pump 114 and amplifier 117, an even and predictable flow of powder is initiated through the system to the nozzle. In the absence of the diffuser airflow between the nozzle and the pump, the powder contained in the system at the conclusion of a pumping cycle would settle out in the powder flow line and upon the restart of a new cycle, cause a powder puff or unpredictable excess of powder to initially start the powder flow cycle.

While we have illustrated and described only a limited number of embodiments of the invention of this application, persons skilled in the art to which this invention pertains will appreciate numerous changes and modifications which may be made without departing from the spirit of our invention. Therefore, we do not intend to be limited except by the scope of the following appended claims.

We claim:

1. A method of applying a solid particulate powder coating to the interior surface of hollow, tubular articles, each of which tubular articles has an axis and two open ends, which method comprises moving said articles to a spray station, locating a spray nozzle at said spray station adjacent a first open end of each of said articles, locating a collection shroud at said spray station adjacent a second open end of each of said articles, at said spray station, directing a stream of air-entrained powder into a first open end of each of said articles while applying a vacuum to said collection shroud in order to collect oversprayed powder from said articles through said second open end, and applying an electrostatic charge to said powder upstream of said nozzle so that the powder is electrostatically charged when it emerges from said nozzle.

2. The method of claim 1 which further comprises locating a second collection shroud adjacent said first open end of each of said articles at said spray station, and applying a vacuum to said second collection shroud.

3. A method of applying a solid particulate powder coating to the interior surface of hollow, tubular articles, each of which tubular articles has an axis and two open ends, which method comprises moving said articles to a spray station, locating a spray nozzle at said spray station adjacent a first open end of each of said articles, locating a collection shroud at said spray station adjacent a second open end of each of said articles, at said spray station, directing a stream of air-entrained powder into a first open end of each of said articles while applying a vacuum to said collection shroud in order to collect oversprayed powder from said articles through said second open end, applying an electrostatic charge to said powder upstream of said nozzle so that the powder is electrostatically charged when it emerges from said nozzle, and regulating said vacuum pressure in said shroud so as to obtain a controlled coating of powder on said interior of each of said articles.

4. The method of applying a solid particulate powder coating to the interior surface of hollow, tubular articles, each of which tubular articles has at least one open end, which method comprises moving said articles past a powder spray nozzle, intermittently directing a stream of air through a powder pump contained in a powder supply line to draw powder from a powder supply source and to cause said powder to flow through said powder supply line to said nozzle, locating a collection shroud adjacent one open end of said articles, directing a stream of air-entrained powder from said powder supply line and from said nozzle into said at least one open end of said articles while applying a vacuum to said collection shroud in order to collect oversprayed powder from said articles, and maintaining a constant flow of air through an air diffuser contained in said powder supply line downstream of said pump and upstream of said nozzle so as to prevent the accumulation of powder in said line during interruption of the flow of air-entrained powder to said nozzle.

5. The method of claim 4 which further comprises applying an electrostatic charge to air-entrained powder flowing through said powder supply line, said charge being applied to said powder upstream of said nozzle.

6. The method of applying a solid particulate powder coating to the interior surface of hollow, tubular articles, each of which tubular articles has at least one open end, which method comprises moving said articles past a powder spray nozzle, intermittently directing a stream of air through a powder pump contained in a powder supply line to draw powder from a powder supply source and to cause said powder to flow through said powder supply line to said nozzle, locating a collection shroud adjacent one open end of said articles, directing a stream of air-entrained powder from said powder supply line and from said nozzle into said at least one open end of said articles while applying a vacuum to said collection shroud in order to collect oversprayed powder from said articles, applying an electrostatic charge to air-entrained powder flowing through said powder supply line, said charge being applied to said powder upstream of said nozzle, maintaining a constant flow of air through an air diffuser contained in said powder supply line downstream of said pump and upstream of said nozzle so as to prevent the accumulation of powder in said line during interruption of the flow of air-entrained powder to said nozzle, and maintaining a second constant flow of air through a second air diffuser contained in said powder supply line upstream of said nozzle and downstream of a section along said powder supply line at which the electrostatic charge is applied to said powder.

7. The method of claim 4 which further comprises fluidizing said powder in said powder supply source before said powder is drawn from said powder supply source by said powder pump.

8. The method of claim 7 which further comprises mechanically agitating said fluidized powder in said powder supply source in order to better maintained said powder in a fluidized state.

9. The method of claim 8 in which said powder supply source is a fluidized bed and in which said mechanical agitation of said powder in said fluidized bed is effected by rotating a rotary stirrer in said fluidized bed.

10. The method of applying a solid particulate powder coating to the interior surface of hollow, tubular articles, each of which tubular articles has at least one open end, which method comprises moving said articles past a powder spray nozzle, intermittently directing a stream of air through a powder pump contained in a powder supply line to draw powder from a powder supply source and to cause said powder to flow through said powder supply line to said nozzle, locating a collection shroud adjacent one open end of said articles, directing a stream of air-entrained powder from said powder supply line and from said nozzle into said at least one open end of said articles while applying a vacuum to said collection shroud in order to collect oversprayed powder from said articles, maintaining a constant flow of air through an air diffuser contained in said powder supply line downstream of said pump and upstream of said nozzle so as to prevent the accumulation of powder in said line during interruption of said flow of air-entrained powder to said nozzle, and reciprocating said nozzle axially and internally of said articles while said powder is sprayed from said nozzle onto the interior surface of said articles.

11. The method of claim 10 wherein said powder supply line from said powder pump to said nozzle is reciprocated with said nozzle.

12. A method of applying a solid particulate powder coating to the interior surface of hollow, tubular articles, each of which tubular articles has an axis and at least one open end, which method comprises moving said articles to a spray station, locating a spray nozzle at said spray station, locating a collection shroud at said spray station, applying an electrostatic charge to said powder upstream of said nozzle so that said powder is electrostatically charged before it emerges from said nozzle, conforming the orifices of said nozzle to the configuration of the interior surface of said tubular articles so as to obtain complete interior surface coverage of powder sprayed from said nozzle onto said interior surface, at said spray station, directing a stream of air-entrained powder through said nozzle into said at least one open end of each of said articles while applying a vacuum to said collection shroud in order to apply a powder coating to the interior surface of said articles and to collect oversprayed powder from said articles, and regulating said vacuum pressure in said shroud so as to obtain a controlled coating of powder on said interior of each of said articles.

13. Apparatus for applying a solid particulate powder coating to the interior surface of hollow, tubular articles, each of which tubular articles has an axis and two open ends, which apparatus comprises means for moving said articles to a spray station along a path of movement perpendicular to the axis of said articles, at least one spray nozzle and at least one collection shroud located at said spray station, said spray nozzle being located adjacent one end of an article on said spray station and said collection shroud being located adjacent the opposite end of said article at said spray station, means for directing a stream of air-entrained powder into one open end of each of said articles while applying a vacuum pressure to said collection shroud at the opposite open end of said articles, and means located upstream of said nozzle for applying an electrostatic charge to said powder before it emerges from said nozzle.

14. The apparatus of claim 13 which further comprises a second collection shroud located adjacent said one open end of each of said articles at said spray station, and means for applying a vacuum pressure to said second collection shroud.

15. Apparatus for applying a solid particulate powder coating to the interior surface of hollow, tubular articles, each of which tubular articles has an axis and two open ends, which apparatus comprises means for moving said articles to a spray station along a path of movement perpendicular to the axis of said articles, at least one spray nozzle and at least one collection shroud located at said spray station, said spray nozzle being located adjacent one end of an article on said spray station, and said collection shroud being located adjacent the opposite end of said article at said spray station, means for directing a stream of air-entrained powder into one open end of each of said articles while applying a vacuum pressure to said collection shroud at the opposite open end of said articles, means located upstream of said nozzle for applying an electrostatic charge to said powder before it emerges from said nozzle, and means for regulating said vacuum pressure in said shroud so as to obtain a controlled coating of powder on said interior of each of said articles.

16. Apparatus for applying a solid particulate powder coating to the interior surface of hollow, tubular articles, each of which tubular articles has an axis and at least one open end, which apparatus comprises conveyor means for moving said articles past a powder spray nozzle along a path of movement perpendicular to the axis of said articles, said nozzle being located at the discharge end of a powder supply line which includes a venturi pump, an air amplifier and an air diffuser, said air diffuser being located downstream of said venturi pump and said air amplifier, means for intermittently directing a stream of air through said venturi pump and through said air amplifier to draw powder from a powder supply source and to cause said powder to flow to said nozzle through said powder supply line, a powder collection shroud locatable in aligned relation with said nozzle, means for applying a vacuum to said collection shroud in order to collect oversprayed powder from an article aligned with said nozzle, and means for maintaining a constant flow of air through said air diffuser to said powder supply line so as to prevent the accumulation of powder in said line during interruption of the flow of air-entrained powder to said nozzle.

17. The apparatus of claim 16 which further comprises means for applying an electrostatic charge to air-entrained powder flowing through said powder supply line, said charge being applied to said powder upstream of said nozzle.

18. The apparatus of claim 17 which further comprises a second air diffuser contained in said powder supply line, said second air diffuser being located upstream of said nozzle and downstream of a section along said powder supply line at which the electrostatic charge is applied to said powder, and means for maintaining a second constant flow of air through said second air diffuser to said powder supply line.

19. The apparatus of claim 16 which further comprises means for fluidizing said powder in said powder supply source before said powder is drawn from said powder supply source by said venturi pump.

20. The apparatus of claim 19 which further comprises means for mechanically agitating said fluidized powder in said powder supply source in order to better maintain said powder in a fluidized state.

21. The apparatus of claim 20 in which said means for mechanically agitating said powder in said powder supply source comprises a rotary beater.

22. Apparatus for applying a solid particulate powder coating to the interior surface of hollow, tubular articles, each of which tubular articles has an axis and at least one open end, which apparatus comprises means for moving said articles to a spray station along a path of movement perpendicular to the axis of said articles, at least one spray nozzle and at least one collection shroud located at said spray station, means for directing a stream of air-entrained powder through said nozzle into said at least one open end of each of said articles, means for applying a vacuum pressure to said collection shroud in order to collect oversprayed powder from said articles, means located upstream of said nozzle for applying an electrostatic charge to said powder before it emerges from said nozzle, and means for regulating said vacuum pressure in said shroud so as to obtain a controlled coating of powder on said interior of each of said articles.

* * * * *